Nov. 15, 1966     R. A. SCHROTH     3,284,955
MOTOR VEHICLE SEAL
Filed June 1, 1964
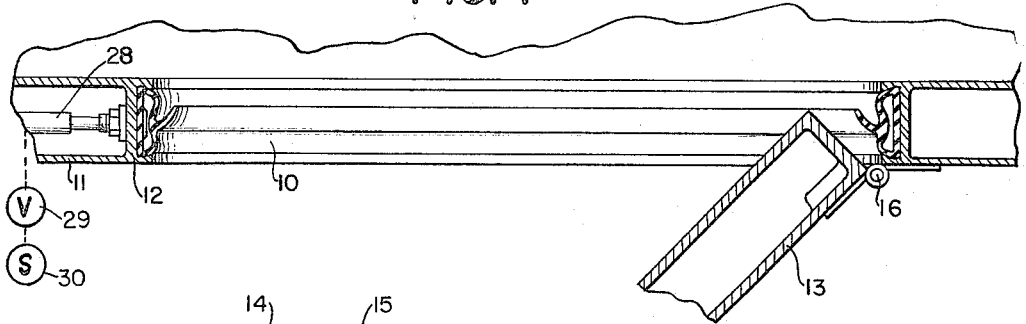
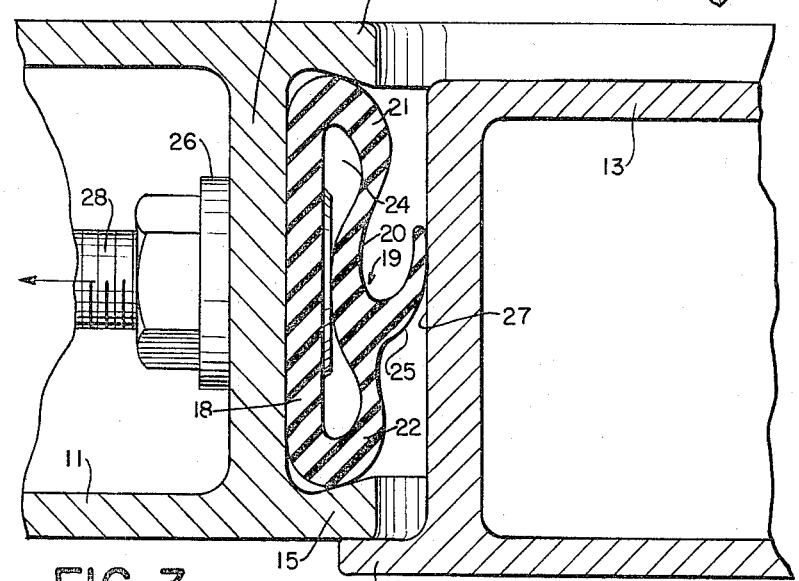
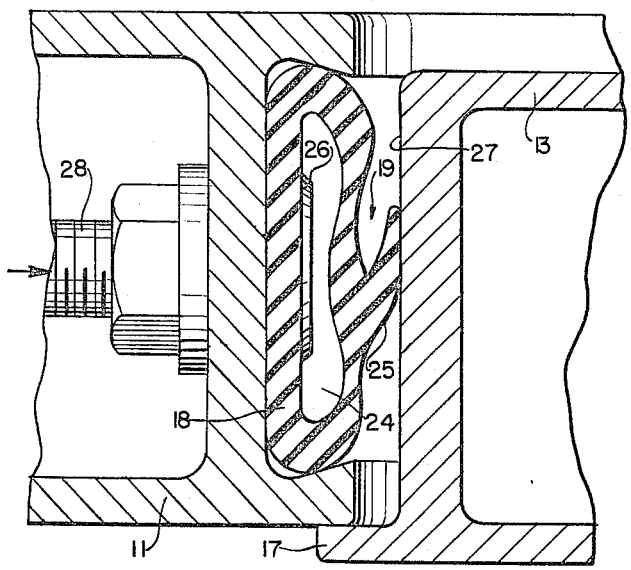
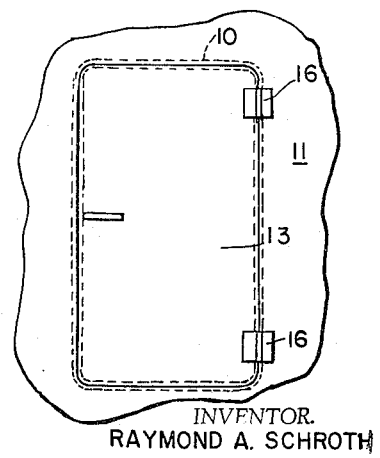
INVENTOR.
RAYMOND A. SCHROTH
BY
Mandeville & Schweitzer
ATTORNEYS 3,284,955
MOTOR VEHICLE SEAL
Raymond A. Schroth, Pawling, N.Y., assignor to The Presray Corporation, Pawling, N.Y., a corporation of New York
Filed June 1, 1964, Ser. No. 371,565
2 Claims. (Cl. 49—477)

The present invention relates to the sealing of doors and more particularly to the dynamic sealing of amphibious motor vehicle doors and door frames.

With the development of amphibious motor vehicles designed to be operated while submerged or partially submerged in water, a need has arisen for seals which will provide greater and more absolute sealing than that which has been obtainable heretofore with conventional seals. In the sealing of doors using conventional static or non-inflatable seals, that is, resilient seals which are deformed by mechanical compression, alone, between a door and its frame, the efficiency of the seal is often dependent upon and in some cases is limited by the smoothness of the opposing surfaces to be sealed, the gap between the surfaces, and the nature of the mechanical compression force exerted on the seal, all of which criteria are functions of the manufacturing and design tolerances employed. Accordingly, a most important aspect of the present invention is the provision of a high degree of positive or absolute sealing which is not subject to the limitations of conventional seals and is not dependent upon the maintenance of close tolerances for its great degree of sealing.

In accordance with the principles of the invention, a new and improved dynamic or inflatable seal has been developed which provides the requisite degree of absolute sealing required in amphibious and like applications without necessitating the maintenance of extremely close tolerances at the surfaces to be sealed, which close tolerances, as will be understood, require costly precision machining and finishing operations. Moreover, the new inflatable seal is specifically constructed to provide a predetermined degree of initial or static sealing upon the closure of a door into its frame for normal or non-amphibious applications requiring less than absolute sealing, and, when necessary, in amphibious and like applications, upon being actuated by internal fluid pressure (hydraulic or pneumatic) to provide a final or secondary degree of dynamic sealing which absolutely seals the door and frame combination against leakage of any kind.

As an important aspect of the invention, a vehicle seal is provided having a unique cross section which provides for mechanical strength, mechanical resiliency, and a predetermined ready inflatability of its sealing portions when subjected to an internal fluid actuating pressure. The new seal provides absolute sealing of all door and frame combinations having relatively rough, uneven, or somewhat irregular surfaces, which sealing is effected by pneumatically or hydraulically expanding the seal, rather than by mechanical compression alone, or by highly finishing the sealed surfaces by grinding or other, costly surface finishing operations. Furthermore, the new inflatable seal accommodates the use of greater tolerances between sealed vehicle door and frame surfaces, greatly simplifying their production. Thus it will be appreciated that the new and improved dynamic seal introduces many manufacturing economies into the production of absolutely sealed door and frame combinations without sacrificing and, in fact, while improving the degree of sealing obtained.

More specifically, the motor vehicle seal of the present invention is generally tubular or hollow in shape and has a solid sealing lip integral therewith, which lip is adapted to be sealingly deformed initially by the compressive action of the door against the frame and, thereafter, finally sealed by the expansion of the hollow seal body by the admission of pressurized sealing fluid thereinto.

For a more complete understanding of the present invention reference should be made to the following detailed description and the accompanying drawing in which:

FIG. 1 is a cross-sectional elevational view of a vehicle door and frame combination including an inflatable seal embodying the principles of the invention, FIG. 2 is an enlarged cross-sectional view of the inflatable seal of the present invention showing the seal in a deactuated condition in which it provides static sealing of the closed vehicle door and frame combination, FIG. 3 is an enlarged cross-sectional view of the seal of the present invention showing the seal in an actuated condition in which it provides dynamic, absolute sealing of the closed vehicle door and frame combination, and FIG. 4 is a side elevational view of a vehicle door and frame combination including an inflatable seal embodying the principles of the invention.

Referring now to the drawing, and particularly to FIGS. 1 and 2 thereof, a new dynamic, inflatable seal 10 is shown in a contemplated environment in a vehicle door frame 11 having a retaining channel 12 of a U-shaped cross section. As shown in FIG. 4, the profile of the seal 10 is generally similar to that of the door opening or portal defined by frame 11 and closed by a mating vehicle door 13. In accordance with the invention, the seal 10 is retained in the door frame channel 12 against its web 14 by flanges 15 extending therefrom and defining a slightly convergent taper.

The vehicle door 13 has slightly smaller peripheral dimensions than those of the portal defined by the frame; and in accordance with the principles of the invention, the difference in dimensions or gap therebetween is not critical and obviates the necessity for maintaining extremely close surface tolerances. As shown, the door 13 is attached to the frame by spaced hinges 16 and is adapted to be conventionally swung into a seated relation therewith to close the portal. Advantageously, the door may be provided with a stop flange 17 at a free edge to limit the travel of the door in the closing direction through abutment with the frame 11 in the manner shown in FIGS. 2 and 3.

As an important aspect of the invention, the seal is tubular and its walls define a closed, expandable pressure chamber 24 therein. More specifically, as shown in cross section in FIGS. 2 and 3, the chamber is defined by a base wall 18, which is substantially flat, and an opposing "bellows" wall 19, which includes a central concave portion 20 and inner and outer convex portions 21, 22, which in their relaxed conditions (FIG. 1) support the concave portion in a slightly spaced relation with the base wall 18. A flange-like sealing lip 25 is integrally supported in cantilever fashion from the bellows wall 19 slightly inwardly of the area of the junction of the concave portion 20 with the outer convex portion 22. As shown clearly in FIGS. 2 and 3, the pressure chamber portions of the seal are maintained substantially without the silhouette of the frame portal while the inwardly projecting sealing lip 25 extends therefrom and is maintained substantially within the profile of the door frame portol. Advantageously, the lip extends obliquely and in the general direction of door closing.

In accordance with the invention, a pressure fitting 26 is included in the base wall 18 of the seal and provides for communication through a pressure pipe 28, between the pressure chamber 25 and an appropriate fluid pressure source 30, usually compressed air. A suitable control valve 29 is employed for selectively effecting the admission and emission of pressure fluid from the chamber through the fitting 26 for inflating and deflating the seal, as will be understood.

The new and improved vehicle seal 10 is advantageously endless, although for certain applications it may be produced in an elongate, tubular form and provided with moulded end caps. As will be understood, the seal is of similar shape to the door frame and may be readily fitted into a nesting relationship with the channel 12, as shown in FIGS. 2 and 3. An elastomeric material is used to fabricate the dynamic seal in accordance with the invention, and a variety of polymers have been found most suitable. They include natural rubber, neoprene, silicone, styrene-butadiene rubber, nitrile-butadiene rubber, or butyl, which materials may be reinforced with fabric in applications where additional strength or durability is required.

In a typical embodiment of the illustrated seal, the base wall 18 is approximately 1 9/16 inches in width and has a thickness of approximately 1/8 inch. In its relaxed state, the concave portion 20 of the bellows wall is spaced approximately 1/32 inch from the base wall and has a thickness equal to that of the base wall with the exception of the junctions of the convex and concave portions where the thickness is reduced slightly (exaggerated in the drawings) to enhance the flexibility of the bellows wall. The sealing lip 25 extends approximately 5/16 inch from the convex portion, which in turn extends 3/8 inch from the base line of the base wall 18.

Operation of the inflatable seal 10 to provide absolute sealing of the door and the frame combination is as follows: Upon seating of the door 13 in the frame 11, the sealing lip 25 will be engaged and deflected toward the frame by peripheral portions 27 of the door causing the bellows wall 19 to collapse, as shown in FIG. 2. The natural resiliency of the elastomeric material of the seal, enhanced mechanically by the specific bellows wall configuration, will tend to spring the seal back toward its relaxed or unstressed condition, as shown in FIG. 1, to provide a static seal of the opposed, parallel door frame and door surfaces 14, 27, respectively. Thereafter and in accordance with the principles of the invention, pressure fluid such as compressed air is admitted into the pressure chamber to expand the bellows wall 19 inwardly toward the door increasing the area of sealing contact and increasing the pressure exerted by the sealing lip 25 against the door surfaces 27 while also increasing the seal of the bellows wall portions 21, 22 with the tapered flanges 15 of the door frame 11. The pneumatic actuation or inflation of the seal provides what is characterized as dynamic sealing of the door and frame surfaces and results in the effecting of an absolute seal therebetween.

It will be readily appreciated that, due to the dynamic or expansive nature of the new dynamic seal and as an important aspect of the invention, the tolerances of the seated door and frame surfaces and the gap therebetween, need not be maintained or designed as closely as is necessary in conventional door and frame combinations to achieve absolute sealing. Furthermore, this reduction in the closeness of tolerances allows substantial economies in manufacture to be realized through the elimination of costly surface finishing operations.

The new and improved vehicle seal provides both static and dynamic sealing of a vehicle door and frame surfaces, whether relatively unfinished or not, to give a positive final seal which efficiently and reliably prevents leakage through the opposed, sealed surfaces.

Although the present invention has been described with reference to a particular preferred embodiment, it is to be understood that modification may be made by persons skilled in the art without departing from the spirit or from the scope of the appended claims. By way of example only, while the inflatable seal has been illustrated as being incorporated with the door frame structure, it may equally as well be mounted about the periphery of the door itself, being provided with appropriate flexible air connections. In some instances, it is actually preferable to mount the seal on the door rather than in the door frame, to protect the seal from damage by being stepped upon on the threshold, for example. Accordingly, reference should be had to the appended claims in determining the full scope of the invention.

I claim:
1. An elastomeric sealing strip, comprising
 (a) an elongate tubular body having a predetermined mechanically flexible bellows wall spacedly supported from a flat base wall of a first predetermined, uniform thickness and defining a pressure chamber therebetween,
 (b) said bellows wall comprising spaced convex portions and a concave portion therebetween,
 (c) said bellows wall being of non-uniform thickness, said convex portions being no greater than said first predetermined thickness and the areas of junction of said concave portion and said convex portions having a thickness less than said convex portions, and
 (d) a sealing lip extending from said bellows wall.

2. An inflatable seal for a pair of opposed surfaces having a predetermined separation, comprising
 (a) an elongate elastomeric tubular element,
 (b) said element having a relatively flat base wall and a mechanically flexible bellows wall spaced therefrom,
 (c) said walls defining a closed pressure chamber therebetween,
 (d) pressure port means supported in said base wall and accommodating the admission and emission of pressure fluid from said chamber to inflate and to deflate, respectively, said tubular element,
 (e) said bellows wall being readily compressible between the opposed pair of surfaces to be sealed when said element is deflated, and said bellows wall being readily expandable to effect a positive seal of the opposed surfaces when said element is inflated, and
 (f) a flexible sealing lip being integrally supported by said bellows wall and, when said element is deflated, engaging at predetermined first areas thereof one of said surfaces to provide an initial degree of sealing and when said element is inflated engaging said one surface at predetermined second areas greater than said first areas to provide a final degree of sealing greater than said initial degree of sealing.

References Cited by the Examiner

UNITED STATES PATENTS

| | | |
|---|---|---|
| 2,009,445 | 7/1935 | Gould. |
| 2,654,922 | 10/1953 | Krupp _____ 20—69 |

FOREIGN PATENTS

| | | |
|---|---|---|
| 708,483 | 5/1954 | Great Britain. |
| 781,155 | 8/1957 | Great Britain. |
| 905,808 | 9/1962 | Great Britain. |

HARRISON R. MOSELEY, *Primary Examiner.*

W. E. HEATON, *Assistant Examiner.*